US009684489B2

(12) United States Patent
Thornton et al.

(10) Patent No.: US 9,684,489 B2
(45) Date of Patent: Jun. 20, 2017

(54) SQUARING CIRCUIT

(75) Inventors: Mitchell A. Thornton, Dallas, TX (US); Saurabh Gupta, Dallas, TX (US)

(73) Assignee: Southern Methodist University, Dallas, TX (US)

( * ) Notice: Subject to any disclaimer, the term of this patent is extended or adjusted under 35 U.S.C. 154(b) by 247 days.

(21) Appl. No.: 13/601,709

(22) Filed: Aug. 31, 2012

(65) Prior Publication Data

US 2014/0067893 A1    Mar. 6, 2014

(51) Int. Cl.
*G06F 7/544* (2006.01)
*G06F 7/552* (2006.01)

(52) U.S. Cl.
CPC .............. *G06F 7/544* (2013.01); *G06F 7/552* (2013.01); *G06F 2207/5523* (2013.01)

(58) Field of Classification Search
CPC .......................... G06F 2207/5523; G06F 7/552
USPC .................. 708/490, 606, 620, 625
See application file for complete search history.

(56) References Cited

U.S. PATENT DOCUMENTS 5,642,306 A * 6/1997 Mennemeier et al. ....... 708/625
6,260,056 B1 * 7/2001 Dalal ............................. 708/606

OTHER PUBLICATIONS

Vladimir Risojevic, et al., "A Simple Pipelined Squaring Circuit for DSP," ICCD '11 Proceedings of the 2011 IEEE 29th International Conference on Computer Design, ISBN: 978-1-4577-1953-0, 2011, pp. 162-167.

E. Chaniotakis, et al., "Long Number Bit-Serial Squarers" Proceedings of the 17$^{th}$ IEEE Symposium on Computer Arithmetic (ARITH'05), Jun. 2005, 8 pages.
Tien Chi Chen, "A Binary Multiplication Scheme Based on Squaring" IEEE Transactions on Computers, vol. C-20, No. 6, Jun. 1971, pp. 678-680.
Luigi Dadda, "Squarers for Binary Numbers In Serial Form" IEEE Symposium on Computer Arithmetic, Jun. 4-6, 1985, 10 pages.
Satyendra R. Datla, et al., "A Low Power High Performance Radix-4 Approximate Squaring Circuit" 20$^{th}$ IEEE International Conference on Application-Specific Systems, Architectures and Processors, Jul. 2009, pp. 91-97.
D. De Caro, et al., "Parallel Squarer Using Booth-Folding Technique" Electronics Letters, vol. 37, No. 6, Mar. 15, 2001, pp. 346-347.
Fengqi Yu et al., "Multirate Digital Squarer Architectures" IEEE International Conference on Electronics, Circuits and Systems, vol. 1, Sep. 2001, pp. 177-180.
Paolo Ienne, et al., "Bit-Serial Mutlipliers and Squarers" IEEE Transactions on Computers, vol. 43, No. 12, Dec. 1994, pp. 1445-1450.
Jason Moore, et al., "A Low Power Radix-4 Dual Recoded Integer Squaring Implementation for Use in Design of Application Specific Arithmetic Circuits" Asilomar Conference on Signals, Systems, and Computers, Oct. 2008, pp. 1819-1822.

(Continued)

*Primary Examiner* — Andrew Caldwell
*Assistant Examiner* — Calvin M Brien
(74) *Attorney, Agent, or Firm* — Fish & Richardson P.C.

(57) ABSTRACT

Methods, apparatuses, and computer program products for squaring an operand include identifying a fixed-point value with a fixed word size and a substring size for substrings of the fixed-point value, wherein the fixed-point value comprises a binary bit string. A square of the fixed-point value can be determined using the fixed point value, the substring size, and least significant bits of the fixed-point value equal to the substring size.

2 Claims, 6 Drawing Sheets

(56) References Cited

OTHER PUBLICATIONS

K.Z. Pekmestzi, et al., "Long Unsigned Numbers Systolic Serial Multipliers and Squarers" IEEE Transactions on Circuits and Systems II: Analog and Digital Signal Processing, vol. 48, No. 3, Mar. 2001, pp. 316-321.
Johnny Pihl, et al., "A Multiplier and Squarer Generator for High Performance DSP Applications" IEEE 39$^{th}$ Midwest Symposium on Circuits and Systems, Aug. 1996, pp. 109-112.
James E. Stine, et al., "FreePDK: An Open-Source Variation-Aware Design Kit" IEEE International Conference on Microelectronic Systems Education (MSE'07) Jun. 2-4, 2007, 2 pages.
Antonio G.M. Strollo, et al., "Booth Folding Encoding for High Performance Squarer Circuits" IEEE Transactions on Circuits and Systems—II Analog and Digital Signal Processing, vol. 50, No. 5, May 2003, pp. 250-254.
Jae-tack Yoo, et al. "A Fast Parallel Squarer Based on Divide-and-Conquer" IEEE Journal of Solid-State Circuits, vol. 32, No. 6, Jun. 1997, pp. 909-912.
Behrooz Parhami, Computer Arithmetic Algorithms and Hardware Designs, Oxford University Press, ISBN-0-19-512583-5, 2000, 17 pages.
D. Michael Miller, et al., "Multiple-Valued Logic Applications" Multiple Valued Logic: Concepts and Representations, Morgan & Claypool Publishers, ISBN-10-1598291904, 2008, 25 pages.
William Stallings, Cryptography and Network Security Principles and Practices, Prentice-Hall, Fourth Edition, 2006, 27 pages.
Peter Kornerup, et al., "Finite Precision Number Systems and Arithmetic", Encyclopedia of Mathematics and Its Applications, Cambridge University Press, ISBN-978-0-521-76135, 2010, 66 pages.

\* cited by examiner

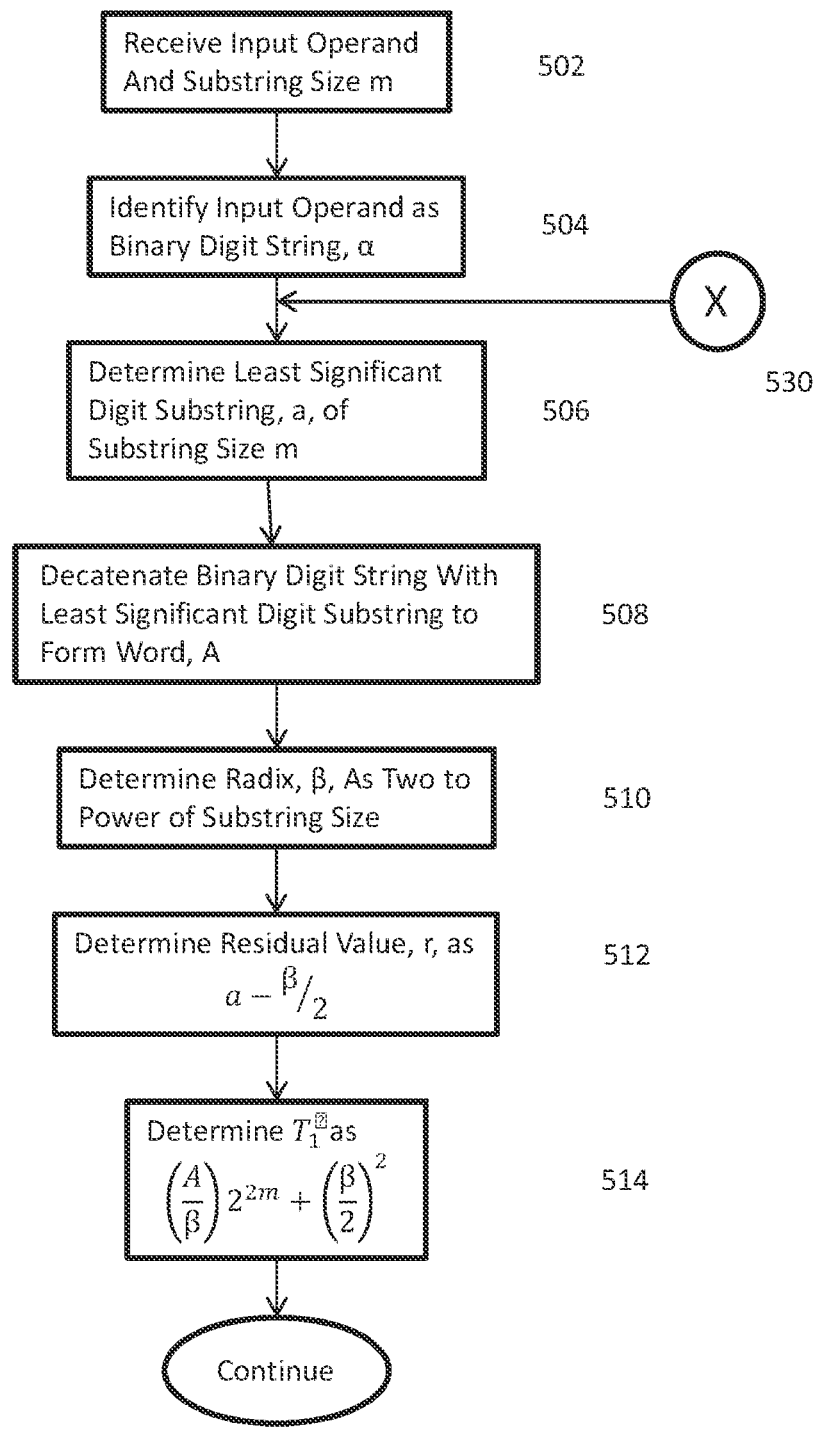

SQUARING CIRCUIT

FIELD

The present disclosure is directed to a squaring technique that can be implemented as a circuit or as a software algorithm, and more particularly, a squaring technique that uses an arbitrary radix number system.

BACKGROUND

Squaring is an arithmetic operation used in many digital systems. Squaring circuits can be used for digital signal processing applications, such as image compression, pattern recognition, and others. Squaring is also used as an atomic computation for some cryptography algorithms. Squaring circuit architecture is also commonly incorporated in graphics processors. Several general purpose multiplier circuit designs have also been proposed based on squaring of input operands.

SUMMARY

Certain aspects of the present disclosure pertain to methods, circuit elements, and computer program products for squaring a value. A fixed-point value with a fixed word size and a substring size for substrings of the fixed-point value can be identified, wherein the fixed-point value comprises a binary bit string. A square of the fixed-point value can be determined using the fixed point value, the substring size, and least significant bits of the fix-point value equal to the substring size.

In some implementations, a square can be determined by iteratively determining squares of substrings of the fixed-point value using least significant bits of each operand equal to the substring size and the substring of the fixed-point value, wherein the operand in each iteration comprises a portion of the previous operand, wherein the operand is formed by decatenating the previous operand least significant bits equal to the substring size.

In some implementations, determining a square of a fixed point value can include identifying the fixed-point value as an operand. A substring of the operand can be determined as the least significant bits of the operand where the substring is of a specified substring size. The substring can be decatentated from the operand to form a word. The substring can be squared using the word, the substring, and the substring size. The square of the substring can be added to a result. If a length of the word is greater than zero, the word can be identified as the operand and the determining, decatenating, squaring, and adding steps can be executed. If the length of the word and substring is zero, one more iteration is undertaken to account for non-zero residual values, and the result is identified as the square of the fix-point value.

In some implementations, the following expansion can be calculated:

$$\alpha^2 = \left(\frac{A}{\beta}\right)^2 \beta^2 + \left(\frac{A}{\beta}\right)\beta^2 + \left(\frac{\beta}{2}\right)^2 + 2\left(A + \frac{\beta}{2}\right)b + b^2,$$

where A is the word, β is the radix, the substring size is $\log_2 [\beta]$, and b is the substring value minus β/2.

The details of one or more embodiments of the disclosure are set forth in the accompanying drawings and the description below. Other features, objects, and advantages will be apparent from the description and drawings, and from the claims. For example, hardware-based squaring circuits, such as those described here, can accommodate the increasing demand for cryptography hardware support in low power, high-speed mobile devices.

DESCRIPTION OF THE DRAWINGS

FIG. 5A is an example of a portion of a process flow diagram for squaring an input value in accordance with the present disclosure.

DETAILED DESCRIPTION

The present disclosure describes an iterative squaring technique that produces a 2 nm-bit length result, $\alpha^2$, based on an input operand (often referred to as a squarand) α of nm-bits in length. The circuit produces 2m bits of the output $\alpha^2$ during each iterative step. By considering an m-bit grouping within the squarand α as representing a single radix-$2^m$ digit, the circuit can be considered a digit-serial implementation that produces two m-bit digits per iteration.

This digit-serial architecture may allow for a tradeoff between bit-serial and parallel architectures by allowing for the digit to be represented by m bits. Because 2m bits of the result are computed in each iterative step, varying m can yield more or less parallelism while inversely affecting required circuit area. Thus, a minimal or otherwise reduced area circuit can be realized when m is small (bit-serial for the case m=1) and a large parallel circuit results at the other extreme when m is set to the wordsize of the squarand. Designers may be able to choose an appropriate value of m such that performance requirements are met while minimizing or otherwise reducing the amount of circuitry required.

Arithmetically, the technique assumes the squarand is represented as a higher-radix digit string where each digit is represented by an m-bit substring. Furthermore, the technique may yield two digits of output squared value during each iterative step; hence, a total of 2m bits of the squared result are computed at each iterative step.

Figure 1:
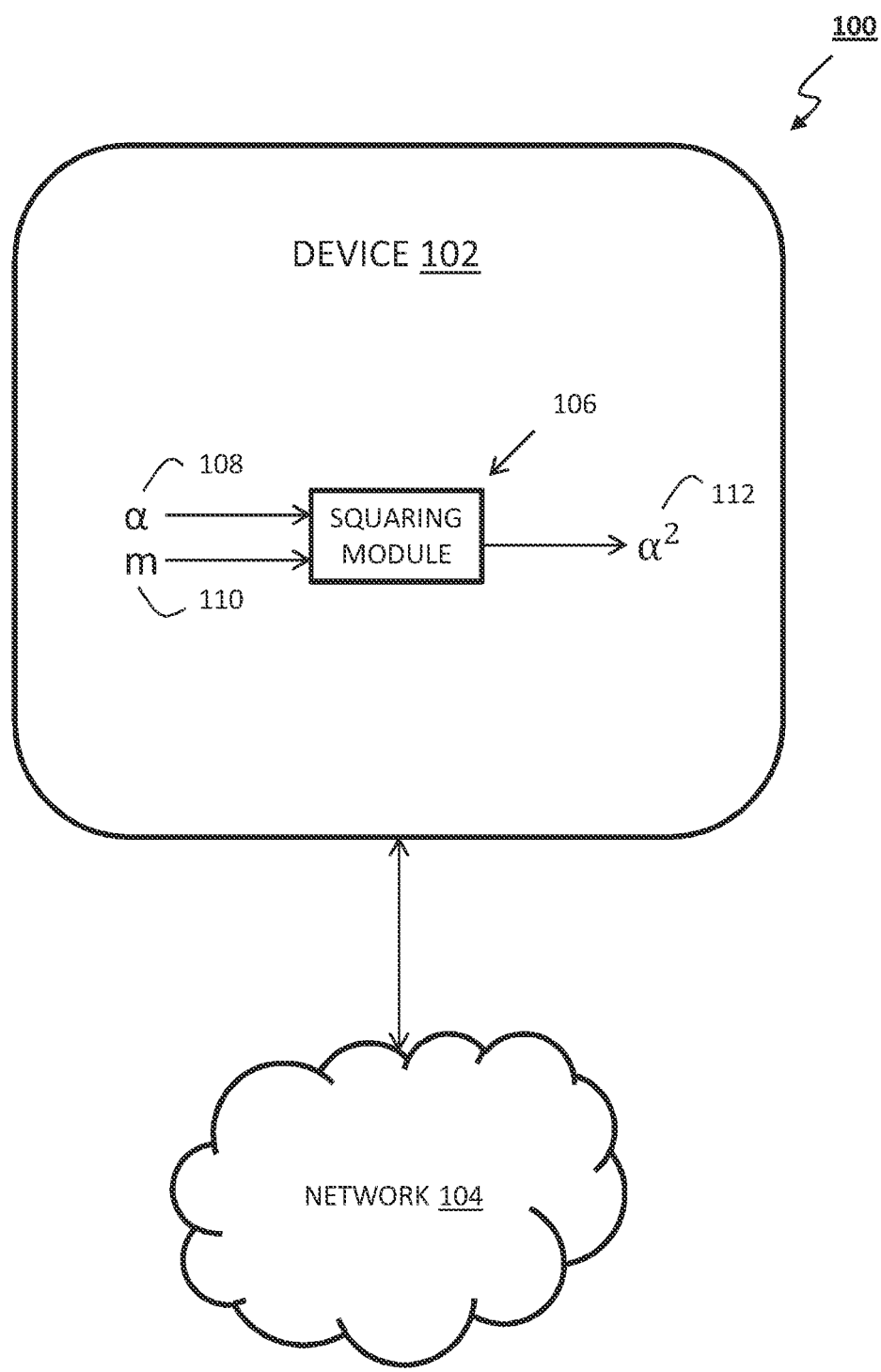
FIG. 1 is a schematic diagram of an example landscape that includes a device with a squaring circuit in communication with a network.

FIG. 1 is a schematic diagram of an example landscape 100 that includes a device 102 having a squaring module 106 in accordance with the present disclosure in communication with a network 104. The device 102 may be any type of computing device, such as a personal computer, a touch screen terminal, a workstation, a network computer, kiosks, wireless data ports, wireless or wireline phones, smart-phones, personal data assistants (PDAs), one or more processors within these or other devices, or any other suitable processing device, to execute operations associated with squaring algorithms. For example, device 102 may be a PDA operable to wirelessly connect with a network 104. In another example, client 102 may be a laptop or tablet computer that includes an input device, such as a keypad, touch screen, mouse, or other device that can accept information, and an output device that conveys information, including digital data, visual information, or graphical user interface. Device 102 may also be a server that can execute operations using input data received from other devices and can send results of operations to other devices across network 104.

The device 102 includes a squaring module 106. The squaring module 106 (described in more detail in FIG. 2) receives as an input a squarand α 108 and a value m 110 that indicates the substring bit length for the squaring operation. The squaring module 106 outputs a result $\alpha^2$ 112. The squarand 108 and the substring bit length 110 may be received locally through an input device of device 102, or may be received from a device across network 104. The result 112 may be displayed to a user of device 102 on a local display or graphical user interface. In some implementations, the result 112 can be transmitted to another device across network 104.

Network 104 facilitates wireless or wireline communication between device 102 and other devices. Network 104 may be all or a portion of an enterprise or secured network. In another example, network 104 may be a VPN between device 102 and other devices across a wireline or wireless link. Such an example wireless link may be via 802.11a, 802.11b, 802.11g, 802.11n, 802.20, WiMax, and many others. The wireless link may also be via cellular technologies such as 3GPP GSM, UMTS, LTE, etc. While illustrated as a single or continuous network, network 104 may be logically divided into various sub-nets or virtual networks without departing from the scope of this disclosure, so long as at least portion of network 104 may facilitate communications between senders and recipients of requests and results. In other words, network 104 encompasses any internal and/or external network, networks, sub-network, or combination thereof operable to facilitate communications between various computing components in system 100. Network 104 may communicate, for example, Internet Protocol (IP) packets, Frame Relay frames, Asynchronous Transfer Mode (ATM) cells, voice, video, data, and other suitable information between network addresses. Network 104 may include one or more local area networks (LANs), radio access networks (RANs), metropolitan area networks (MANs), wide area networks (WANs), all or a portion of the global computer network known as the Internet, and/or any other communication system or systems at one or more locations.

The following notation may be used in the description of the digit-serial fixed-point squaring algorithm:

β represents the radix or base of a number system. β may be in the set of natural numbers, $\beta \in \mathbb{N}$.

The 'radix polynomial' form of a value a is written as an n-term polynomial of the form:

$$\alpha = a_{n-1}\beta_{n-1} + a_{n-2}\beta_{n-2} + \ldots + a_2\beta_2 + a_1\beta_1 + a_0\beta_0$$

A value α can also be represented in the radix-β number system in the form of a positional string of n characters denoted by $\alpha = [a_{n-1}\ a_{n-2}\ \ldots\ a_2\ a_1\ a_0]$. For clarity, the character strings denoting the positional digit representations of a value α may be enclosed by square brackets. The digits $a_i$ are the coefficients of the radix-polynomial form and their position within the string inherently denotes the exponent of the radix β.

Each character $a_i$ in a positional string representing a value is referred to as a "digit" regardless of the radix of the number system. Binary digits may alternatively be referred to as "bits."

Digits are restricted to the natural numbers when $\beta \leq 10$, and are members of the set:

$$\{a_i \in \mathbb{N} \mid 0 \leq a_i \leq \beta - 1\}.$$

For the case where β>10, alternative single characters are used to represent a digit such as the characters "A" through "F" for the case of β=16.

Where necessary for clarity, digit strings are subscripted by the radix β of the particular number system being used, $\alpha = [a_{n-1}\ a_{n-2}\ \ldots\ a_2\ a_1\ a_0]_\beta$.

LSD(α,k) and MSD(α,k) are operators that yield k least significant or most significant digits, respectively, in the digit string representing a value α. LSD(α,1) represents the least significant digit of α, LSD(α,1)=$a_0$. Likewise the most significant digit is given as MSD(α,1)=$a_{n-1}$.

{A,B,C} denotes concatenation of the content of registers A, B, and C which can be of any size and whose individual sizes may differ.

SHL(A,k,B) denotes the operation of shifting the content of register A to the left by k bits and setting the least significant k bits to the content of register B. A can be of any size greater than or equal to the size of B and B must be of size k.

SHR(A,k,B) denotes the operation of shifting the content of register A to the right by k bits and setting the most significant k bits of A to the content of register B. A can be of any size greater than or equal to the size of B and B must be of size k.

A←B denotes the operation of setting the content of register A with that of register B. A and B can be the same size in some implementations.

The radix-β value A is defined as A=α−$a_0$. Expressed as a positional n-digit string:

$$A = [a_{n-1}a_{n-2}\ \ldots\ a_2a_10]_\beta.$$

Thus, A can be formed by replacing LSD(α,1)=$a_0$ with the zero digit $[0]_\beta$ or as:

$$A = \{SHR([\alpha-0]_\beta,1,[0]_\beta),[0]_\beta\}.$$

The present disclosure describes a circuit and algorithm such that the choice of radix β allows for a trade-off in logic circuit area versus throughput performance in the computation of $\alpha^2$ when α is represented as a binary bit string. Higher values of β allow more bits to be produced per iterative step in the resulting representation of $\alpha^2$. A tradeoff occurs in that the amount of computation or logic required at each iterative step increases for higher radix values.

In the basis of the algorithm as stated here, it is assumed that the squarand is of the form of a binary bit string. Intermediate computations can be efficiently implemented when the radix β is in the form $\beta = 2^m$ where m is a positive integer m≥2. Efficiency results since $\beta = 2^m$ allows each higher radix digit in the string representing α to be equivalent to an m-bit substring within α. α, in terms of a higher-radix digit string, is simply the concatenation of the disjoint m-bit substrings of α in binary form where LSD(α, 1) is the least significant m bits, the subsequent next significant higher-radix digit is represented by the next group of m bits to the left of LSD(α,1), and so on.

For convenience in specifying the basis of the algorithm, Equation (1) can be written with the restriction that $\beta = 2^m$ and some of the individual terms on the right-hand side of the equation can be denoted as $T_1$, $T_2$, and $T_3$. $\alpha^2$ can be written as:

$$\alpha^2 = \left(\frac{A}{\beta}\right)^2 2^{2m} + \left(\frac{A}{\beta}\right) 2^{2m} + \left(\frac{\beta}{2}\right)^2 + 2\left(A + \frac{\beta}{2}\right)b + b^2 = \quad (1)$$

$$\left(\frac{A}{\beta}\right)^2 2^{2m} + T_1 + T_2 + T_3$$

The terms $T_1$, $T_2$, and $T_3$ are explicitly defined as follows:

$$T_1 = \left(\frac{A}{\beta}\right) 2^{2m} + \left(\frac{\beta}{2}\right)^2;$$

$$T_2 = 2\left(A + \frac{\beta}{2}\right)b;$$

$$T_3 = b^2$$

The idea behind the algorithm may be to compute terms $T_1$, $T_2$ and $T_3$ during each iterative step and accumulate them with the previous result. Subsequent iterations use $A/\beta$ from the $(A/\beta)^2$ term in Equation (1) as a squarand. The subsequent operand $A/\beta$ for each iterative step is a digit string containing one less digit than the squarand in the previous step indicating that the iterative algorithm requires $O(n/m)$ iterations to complete. The $2^{2m}$ shifting factor of the first term in Equation (1) illustrates the fact that two digits (2m length bitstrings) are produced at each step and they represent digits in $\alpha^2$ that are produced in the order of the lesser significant digits first.

Several observations may be used to more efficiently implement the computation of the three terms $T_1$, $T_2$, and $T_3$ in the squaring algorithm. First, the term $A/\beta$ may be efficiently obtained by shifting the digit string representing $\alpha$ one position to the right and discarding $a_0$, $A/\beta = [a_{n-1} \, a_{n-2} \ldots a_2 \, a_1]_\beta$. Second, values that are multiplied by a factor of $\beta = 2^{km}$ may be easily obtained by shifting the value to left by km bit positions and inserting a radix-$\beta$ zero digit place holder $[0]_\beta$ for the vacated least significant digits. Third, the term $\beta/2$ is always of the form of a single radix-$\beta$ digit. Expressed as an m-bit binary string, $\beta/2 = [10 \ldots 0]_2$. Finally, the term $(\beta/2)^2$ is always of the form of two radix-$\beta$ digits with the most significant digit of value $\beta/4$ and the least significant digit of value zero. Hence, expressed as a 2m-bit binary string, $(\beta/2)^2 = [010 \ldots 0]_2$.

Term $T_1$ can be computed in a single operation. Making use of the first and second observations, the value $(A/\beta)2^{2m}$ is obtained by forming the digit string $[a_{n-1} \, a_{n-2} \ldots a_2 \, a_1 00]_\beta$. Furthermore, based on the fourth observation, $T_3 = (\beta/2)^2$ can always be expressed as two radix-$2^m$ digits (2m bits) denoted as $[q_1 q_0]_\beta$. Thus, $T_1$ is obtained by forming the string $[a_{n-1} \, a_{n-2} \ldots a_2 \, a_1 \, q_1 \, q_0]_\beta$. From the fourth observation, $q_1 = \beta/4$ and $q_0 = 0$ so that $(\beta/2)^2 = [q_1 \, q_0]_\beta = [(\beta/4)0]_\beta$. Thus, the digit string representation for T1 is $[a_{n-1} \, a_{n-2} \ldots a_2 \, a_1 (\beta/4)0]_\beta$.

Term T2 is computed by first forming a digit string representing $2(A+\beta/2)$ and then multiplying this string with the single radix-$\beta$ digit b. Relying on the first, second, and third observations, $A = a_{n-1} \, a_{n-2} \ldots a_2 \, a_1 \, 0]_\beta$ and $\beta/2$ may be represented as a single unsigned radix-$2^m$ digit (m-bit string). Therefore, $(A+\beta/2) = [a_{n-1} \, a_{n-2} \ldots a_2 \, a_1 \, \beta/2]$. To account for the multiplicative factor of 2, the $(A+\beta/2) = [a_{n-1} \, a_{n-2} \ldots a_2 \, a_1(\beta/2)]_\beta$ digit string is then shifted by one bit position to the left resulting in $2(A+\beta/2)$. The multiplicative factor 2 would in general be implemented through the use of an addition operation, $2(A+\beta/2) = (A+\beta/2) + (A+\beta/2)$, when a higher-valued radix $\beta$ is used that is not an integral power of two since this can be considered a "fractional digit shift," if $\beta \neq 2^m$.

The final step in the formation of term $T_2$ involves the multiplication of $2(A+\beta/2) = [a_{n-1} \, a_{n-2} \ldots a_2 \, a_1(\beta/2)]_\beta$ by the signed single radix-$2^m$ digit of $b = a_0 - \beta 2$. Because b is a single digit value, this multiplication may be accomplished with a minimal or reduced amount of computation or circuitry as compared to a general purpose multiply operation or circuit. Clearly, as the value m is increased resulting in a higher valued radix, $2^m$, both computational complexity and overall algorithm throughput may increase. The actual implementation of the multiplication by b may be dependent upon the value m and may be carefully considered for a given realization of the algorithm. Relatively small values of m generally allow for a simple logic circuit or lookup table to be used.

Term $T_3 = b^2$ relies on the computation of the square of the residual value b. The implementation of this computation may also be dependent upon the size of m, which dictates the number of bits required to represent a radix-$2^m$ digit. For smaller values of m, the direct calculation of $b^2$ can be very efficiently implemented as a small combinational logic circuit or through a lookup table. As m increases, the computation of $b^2$ becomes more complex and other methods may be employed.

For large values of m, the computation of $T_3 b^2$ can be accomplished in parallel with the computation of the other two terms $T_1$ and $T_2$ since accumulation of $T_1+T_2+T_3$ with overall result can occur at the end of each iterative step.

After terms $T_1$, $T_2$, and $T_3$ are formulated, they are summed together and accumulated with the previous result. The accumulation takes into account the process of multiplying subsequent iterative operands by $2^{2m}$ and the fact that two independent radix-$\beta$ digits (or, 2m bits) of the final result are produced at each iterative step. This can be implemented in a variety of ways, including using registers. The size of the register may be 2 nm bits where n is the number of radix-$\beta$ digits representing a and m denotes the radix. The final operation of each iterative step of the algorithm is to shift the result register 2m bits to the right and insert the 2m least significant bits of $T_1+T_2+T_3$ into the most significant positions of the shifted result register. Insertion of the two radix-$2^m$ digits in the most significant portion of the result register instead of performing a multi-bit left shift before adding them to the previously accumulated result allows the algorithm to be implemented without the need for an inclusion of a multi-bit left shift operation or the use of a barrel shifting circuit in a hardware realization.

The algorithm uses an iteration index i to determine if all digits of the squarand have been produced. For an n-digit radix-$\alpha$ squarand, the squared result consists of 2n digits. Because two digits are produced per iterative step, the index i ranges from zero to $(n/2)-1$. Initially, when $i=0$, $\alpha$ is the original squarand. During intermediate computations, when $0<i<n/2$, the algorithm iterates and sets the intermediate squarand $\alpha = A/\beta$. In the final iterative step, the squarand argument becomes $\alpha = 0$; however, this step is performed to account for circumstances when the residual b is not zero-valued.

Any given implementation of the algorithm should include careful consideration of the manner in which the signed digit b is represented. When explicitly represented using a radix-complement or a signed-magnitude form, m+1 bits are required to account for the sign. Furthermore, depending upon the definition of the residual, b can take on integer values in either of the ranges $[-(\beta/2),(\beta/2-1)]$ (as is the case in this formulation) or $[-(\beta/2)+1,(\beta/2)]$. However, because there is a one-to-one relationship between the $a_0$ and b values (since $b=a_0-\beta/2$), the m-bit string representing $a_0$ can be used as an encoding for the corresponding b value.

The algorithm formulated in the previous section makes use of several registers. For succinctness, the registers used within the algorithm statement are defined in Table 1, shown below:

TABLE 1

Registers Used in Squaring Algorithm

| name | size (bits) | content |
|---|---|---|
| AB | (n − 1)m | A/β |
| R | 2nm | $\alpha^2$ |
| i | $\log_2$(n/m) | iteration matrix |
| B | m | residual b encoded as LSD(α, 1) |
| ACC | 2 nm | $T_1 + T_2 + T_3$ |
| T1 | 2 nm | $T_1$ |
| T2 | 2 nm | $T_2$ |
| T3 | 2 nm | $T_3$ |
| B2 | m | β/2 |
| B4 | 2 m | $(\beta/2)^2 = (\beta^2/4) = [(\beta/4)0]_\beta$ |

A statement of the algorithm is given below. Intermediate locations within the algorithm are denoted by labels in the form "STEP k." The labels are included for convenience in referring to certain portions of the algorithm and they also indicate clock boundaries in that the results of STEP k−1 are registered before computation occurs in STEP k. As an example, the T2←{AB,B2} operation of STEP 3 must complete before the T2←SHL(T2,1,[0]2) operation of STEP 4 can proceed. Breaking up the computation of term T2 into multiple intermediate registered operations is an example of pipelining the datapath and allows for the overall circuit clock speed to be increased. The steps are described below:

```
INPUT:
   α: nm-bit fixed-point squarand
   m: log₂(β)-bit value, indicates working radix 2ᵐ
OUTPUT:
α²: 2nm-bit value in register R
STEP 1:
   i←0                        /* iteration index */
   R←0                        /* initialize result register */
   B2←[10...0]₂               /* m-bits with MSB=1 */
   B4←[010...0]₂              /* 2m-bits with MSBs=01 */
   AB←α                       /* squarand value */
STEP 2:
   B←LSD(AB,m)                /* encode b as LSD(AB,1) */
   AB←SHR(AB,m,[0..0]₂)       /* MS squarand digits */
STEP 3:
   T1←{AB,B4,[0..0]₂}         /* form T1, m LSbs=0 */
   T2←{AB,B2}                 /* form A+β/2 */
   T3←b×b                     /* compute single digit square,
                                 uses a₀ in B */
STEP 4:
   T2←SHL(T2,1,[0]₂)          /* form 2(A+β/2) */
   ACC←T1+T3                  /* form T₁+T₃ */
STEP 5:
   T2←T2×b                    /* form 2(A+β/2)b, uses a₀ in B */
STEP 6:
   ACC←ACC+T2                 /* form T₁+T₂+T₃ */
STEP 7:
   R←SHR(R,2m,LSD(ACC,2))     /* update result */
   i←i+1                      /* increment iteration counter */
STEP 8:
   if (i=n/m)                 /* check iteration count */
      HALT                    /* computation complete */
   else
      GO TO STEP 2
```

The example algorithm shown above can undergo n/m iterations producing 2m bits of $\alpha^2$ during each iterative step. Therefore, the algorithm has temporal complexity equivalent to O(n/m). In terms of required computational resources, the algorithm requires circuitry to perform shifting, bit-string concatenation, 2 nm-bit operand addition, m×2 nm-bit multiplication, and m-bit operand squaring. While 2 nm-bit operand addition operations are required in STEPs 4 and 6, it is noted that a single 2 nm-bit addition circuit can be used since these sums may be formed sequentially allowing for reuse of the single 2 nm-bit adder. The multiplication and single-digit squaring operations can be implemented in a variety of forms although it is noted that due to the relatively small size of the operands (m bits) very compact and fast circuits such as lookup tables are a practical choice.

Figure 2:
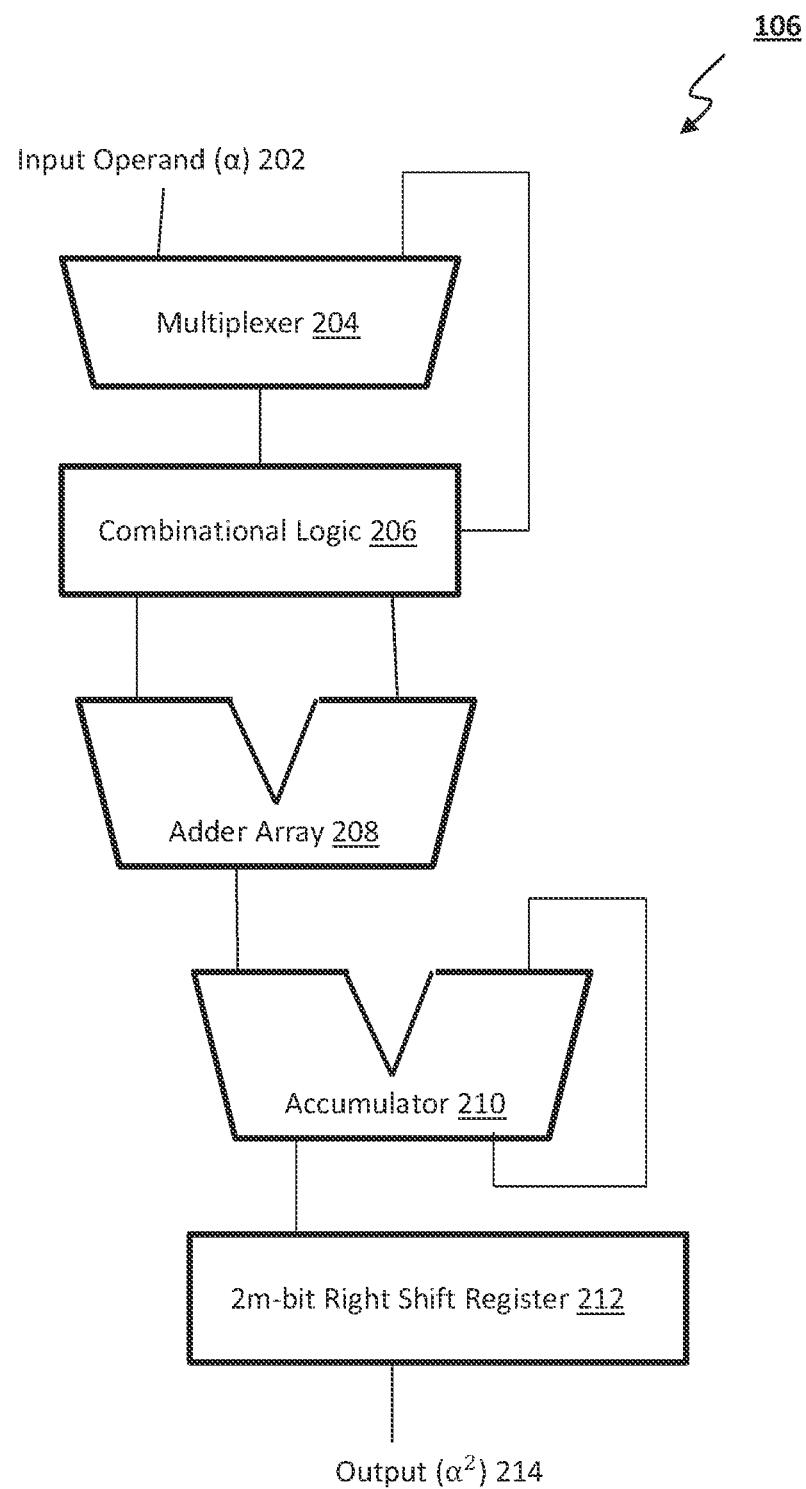
FIG. 2 is a schematic block diagram of an example squaring circuit in accordance with the present disclosure.

FIG. 2 is a schematic block diagram of an example squaring module 106 in accordance with the present disclosure. Squaring module 106 can be a hardware circuit composed of analog and digital circuitry. Digital circuitry includes transistor-based logic circuits and components. In some implementations, squaring module 106 can be implemented as a software algorithm. Squaring module 106 can receive as an input the operand α 202, which is a value to be squared (squarand). In this example circuit, a synchronous digital logic circuit uses a quaternary radix, $\beta=2^2=4$. The operand 202 is received by a multiplexer circuit 204. The computation T3←b×b in STEP 3 above uses a multiplexer based lookup structure. A 4:1 multiplexer with 2m-bit data paths and an m-bit control signal chooses among the appropriate squared values of b. The squared values $b^2$ that drive the multiplexer data inputs are pre-computed before implementation of the circuitry and are either hardwired or stored in registers. Alternatively, a small nonvolatile memory such as a ROM or flash circuit, or a volatile memory such as SRAM or DRAM, could be used with the B register contents driving the address lines and all possible $b^2$ values stored in the memory. Register B drives the control lines of the multiplexer and represents the residual value b. It is noted that B actually contains the least significant digit at as an encoded value for b since $b=a_i-\beta/2$. To clarify this encoding, Table 2 contains all values of b and the corresponding $a_i$ that serves as the m-bit encoded representation of b for the radix-4 quaternary case.

TABLE 2

Encoded Values of b for Radix-4 Number System

| $a_i$ | b | Encoded b in Register B |
|---|---|---|
| 0 | −2 | $[00]_2$ |
| 1 | −1 | $[01]_2$ |
| 2 | 0 | $[10]_2$ |
| 3 | 1 | $[11]_2$ |

The computation of T2←T2×b in STEP 5 of the algorithm is accomplished by using a 4:1 multiplexer as a simple lookup structure with data paths of size 2 nm and an m-bit control signal driven by the content of register B. The idea behind this circuit is similar to that of the T3←b×b computation in STEP 3 with the important difference that the possible T2×b values are computed during each iterative step rather than being precomputed and stored before circuit operation. Fortunately, these values are easily and efficiently computed since, for the quaternary implementation, they consist of the value 2(A+β/2) multiplied by only one of b∈{−2, −1, 0, 1}. Thus, a negated version of 2(A+β/2)=−[2

(A+β/2)] and a single-bit left-shifted shifted version of −[2(A+β/2)] are used as well as 2(A+β/2) and [0 . . . 0] to drive the data inputs of the multiplexer. FIG. 4 contains a diagram of this subcircuit.

The output of the multiplexer 204 is received by combinational logic 206. Combinational logic 206 includes several outputs: one output is coupled to the input of the multiplexer 204. The other outputs of combinational logic 206 are coupled to an adder array 208. Each of the multiplexer 204, the combinational logic 206, and the adder array 208 also include as inputs control signals from a clocked synchronous controller (not shown).

The combinational logic 206 may be implemented based on simplifications in the formation of the intermediate terms $T_1$, $T_2$, and $T_3$, and their various sums. These simplifications exploit the choice of using β=4 as an implicit operand radix and allow for the computation of the intermediate terms $T_1$, $T_2$, and $T_3$ to be implemented with a reduced and simplified set of register transfer level (RTL) operations.

A single quaternary digit $[a_k]_4$ can, in general, be written as a two-bit binary string $[b_{2k+1}b_{2k}]_2$ where $\{b_i \in \mathbb{B}\}$ and $\mathbb{B}=\{0,1\}$. Using this definition, various intermediate terms and their sums can be evaluated for different cases of the least significant digit of the squarand, $a_0 \in \{0, 1, 2, 3\}$. Term $T_1$ is independent of the value of $a_0$ and is always a bit string of length 2n+2 expressed as:

$$T_1[a_{n-1}a_{n-2}\ldots a_2a_110]_4 = [b_{2n-1}b_{2n-2}b_{2n-3}b_{2n-4}\ldots b_5b_4b_3b_20100]_2$$

Case 1

$a_0=[0]_4$ resulting in the residual $b=[-2]_4$, thus $T_3=b^2=[10]_4=[0100]_2$. Term $T_2$ can be expressed as:

$$T_2 = 2\left(A + \frac{\beta}{2}\right)b$$
$$= 2b \times [a_{n-1}a_{n-2}\ldots a_2a_12]_4$$
$$= -[10]_4 \times [a_{n-1}a_{n-2}\ldots a_2a_12]_4$$
$$= -[a_{n-1}a_{n-2}\ldots a_2a_130]_4$$

Combining the terms:

$$T_1 + T_2 + T_3 = \begin{array}{c}[a_{n-1}a_{n-2}\ldots a_2a_110]_4 - \\ [a_{n-1}a_{n-2}\ldots a_2a_120]_4 + -[10]_4\end{array}$$
$$= [0\ldots 0]_4$$
$$= [00\ldots 00]_2$$

Case 2

$a_0=[1]_4$ resulting in the residual $b=[-1]_4$, thus $T_3=b^2=[01]_4=[0001]_2$. Term $T_2$ can be expressed as:

$$T_2 = 2\left(A + \frac{\beta}{2}\right)b$$
$$= 2b \times [a_{n-1}a_{n-2}\ldots a_2a_12]_4$$
$$= -[2]_4 \times [a_{n-1}a_{n-2}\ldots a_2a_12]_4$$
$$= -[0b_{2n-1}b_{2n-2}\ldots b_3b_2100]_2$$

Combining the terms:

$$T_1 + T_2 + T_3 = \begin{array}{c}[b_{2n-1}b_{2n-2}\ldots b_3b_20100]_2 - \\ [0b_{2n-1}b_{2n-2}\ldots b_3b_2100]_2 + [0001]_2\end{array}$$
$$= [0b_{2n-1}b_{2n-2}\ldots b_3b_2001]_2$$

Case 3

$a_0=[2]_4$ resulting in the residual $b=[0]_4$, thus $T_3=b^2=[00]_4=[0000]_2$. Term $T_2$ can be expressed as:

$$T_2 = 2\left(A + \frac{\beta}{2}\right)b$$
$$= 0 \times [a_{n-1}a_{n-2}\ldots a_2a_12]_4$$
$$= [00\ldots 00]_2$$

Combining the terms:

$$T_1 + T_2 + T_3 = [b_{2n-1}b_{2n-2}\ldots b_3b_20100]_2 - [00\ldots 00]_2 + [0000]_2$$
$$= [b_{2n-1}b_{2n-2}\ldots b_3b_20100]_2$$

Case 4

$a_0=[3]_4$ resulting in the residual $b=[1]_4$, thus $T_3=b^2=[01]_4=[0001]_2$. Term $T_2$ can be expressed as:

$$T_2 = 2\left(A + \frac{\beta}{2}\right)b$$
$$= 2r \times [a_{n-1}a_{n-2}\ldots a_2a_12]_4$$
$$= [2]_4 \times [a_{n-1}a_{n-2}\ldots a_2a_12]_4$$
$$= [0b_{2n-1}b_{2n-2}\ldots b_3b_2100]_2$$

For this case, the sum $T_2+T_3$ can be formed directly and it is subsequently combined with term $T_1$ using the addition circuit. $T_2+T_3$ is formed as:

$$T2 + T3 = [0b_{2n-1}b_{2n-2}\ldots b_3b_2100]_2 + [0001]_2$$
$$= [0b_{2n-1}b_{2n-2}\ldots b_3b_2101]_2$$

Table 3 below contains a summary of the results of the intermediate terms and their various sums in terms of values of the least significant digit of the operand at each iterative step.

TABLE 3

| Radix-4 Optimizations | | |
|---|---|---|
| LS D($\alpha_4$, 1) | Intermediate Term | Value |
| 0 | $T_1 + T_2 + T_3$ | $[0\ldots 0]_2$ |
| 1 | $T_1 + T_2 + T_3$ | $[0b_{2n-1} b_{2n-2} \ldots b_3 b_2 001]_2$ |
| 2 | $T_1 + T_2 + T_3$ | $[b_{2n-1} b_{2n-2} \ldots b_3 b_2 0100]_2$ |
| 3 | $T_1$ | $[b_{2n-1} b_{2n-2} \ldots b_3 b_2 0100]_2$ |
| 3 | $T_2 + T_3$ | $[0b_{2n-1} b_{2n-2} \ldots b_3 b_2 101]_2$ |

The combinational logic 206 makes use of the results in Table 3 and outputs the two 2n+2 bit values that are summed in the adder array 208 resulting in $T_1+T_2+T_3$ (i.e., the combinational logic includes two outputs: one for each input of the adder array). For the cases $a_0 \in \{0, 1, 2\}$, $T_1+T_2+T_3$ is formed directly in the combinational logic 206 and is input to the adder array 208 on the leftmost input bus with the right-most input set to the 2n+2 bit string $[00 \ldots 00]_2$. The adder array 208 is used for the case of $a_0=3$, where the left-most input is the bit string $[b_{2n-1} b_{2n-2} \ldots b_3 b_20100]_2$ and the right-most input is $[0b_{2n-1} b_{2n-2} \ldots b_3 b_2101]_2$.

Accumulator 210 consists of an internal accumulator register, an internal adder circuit, and a feedback loop that allows for the internal adder output to be stored in the internal accumulator register. Accumulator 210 can receive the output of the adder array 208 where it is added to the previously stored value in the accumulator register and then stored back into the accumulator register. A right shift register 212 can receive the output of the accumulator. The size of the register 212 may be 2 nm bits where n is the number of radix-$\beta$ digits representing a and m denotes the radix. The final operation of each iterative step of the algorithm is to shift the result register 2m bits to the right and insert the 2m least significant bits of $T_1+T_2+T_3$ into the most significant positions of the shifted result register. Insertion of the two radix-$2^m$ digits in the most significant portion of the result register instead of performing a multi-bit left shift before adding them to the previously accumulated result allows the algorithm to be implemented without the need for an inclusion of a multi-bit left shift operation or the use of a barrel shifting circuit in a hardware realization. After the iterative steps are completed, the square $\alpha^2$ 214 can be output.

Figure 3A:
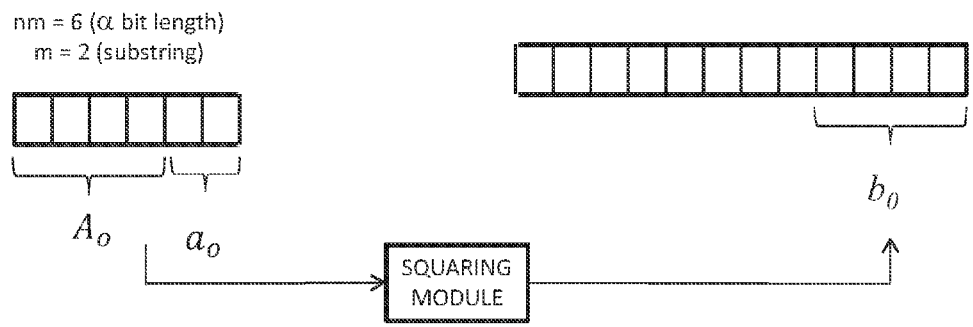
FIGS. 3A-3C are example diagrams of a squaring circuit operating on a six bit string using a two bit substring.
Figure 3B:
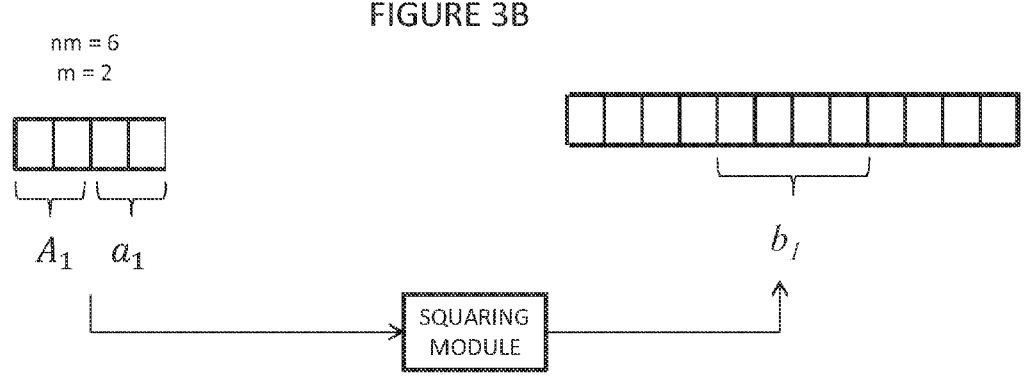
Figure 3C:
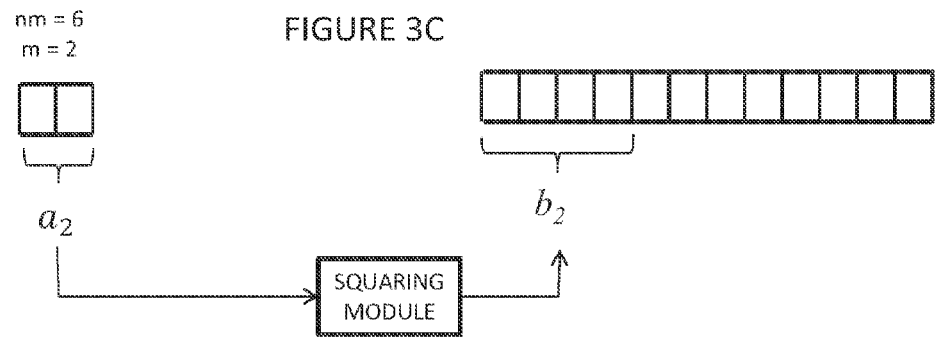

FIGS. 3A-3C are example diagrams of a squaring circuit operating on a six bit string using a two bit substring corresponding to a chosen substring length of m=2 ($\beta=2^2=4$). FIGS. 3A-3C show three iterations used for calculating a value $\alpha^2$, where $\alpha$ has a bit length nm=6 and a substring length m=2. In FIG. 3A, the right-most input bits are represented as $a_0$ and the remaining bits as $A_0$. The least significant bits $a_0$ include 2 bits (m=2). Because the bit length of a is 6, this calculation requires O(3) iterations since 2×3=6. The bits $a_0$ are received into the squaring module, and output as $b_0$ that includes 4 bits (2m bits) and representing two output digits (shown on the right side of the squaring module). In FIG. 3B, the remaining 4 bits of a are then considered. The least significant bits are represented as $a_1$ having 2 bits (m=2), and the remaining 2 bits of $\alpha$ are represented as $A_1$. The value $a_1$ is received by the squaring module, and the output $b_1$ includes 4 bits (2m bits) representing two digits of the output value $\alpha^2$. Finally, in FIG. 3C, the remaining bits of a are represented as $a_2$ (which are the most significant bits of the original string). The value $a_2$ (having 2 bits) is received by the squaring module, and output as $b_2$, which also includes 4 bits (2m bits) representing the two most significant bits of the resultant string $\alpha^2$.

Figure 4A:
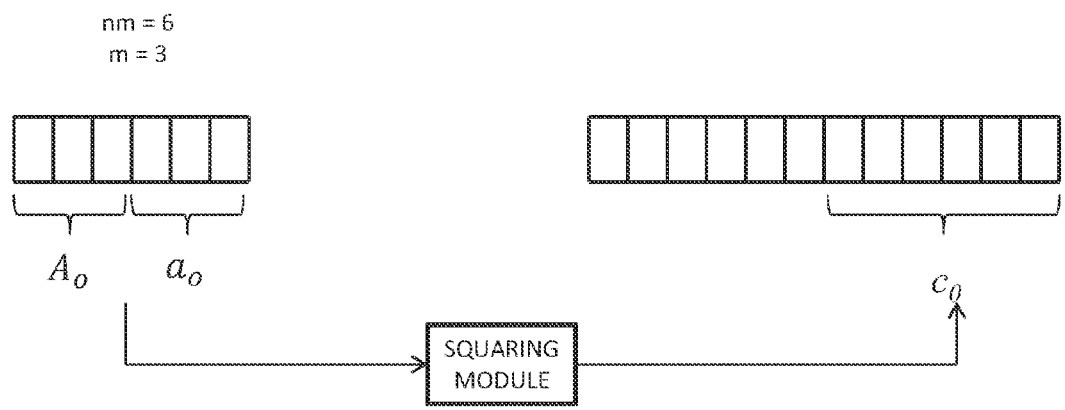
FIGS. 4A-4B are example diagrams of a squaring circuit operating on a six bit string using a three bit substring.
Figure 4B:
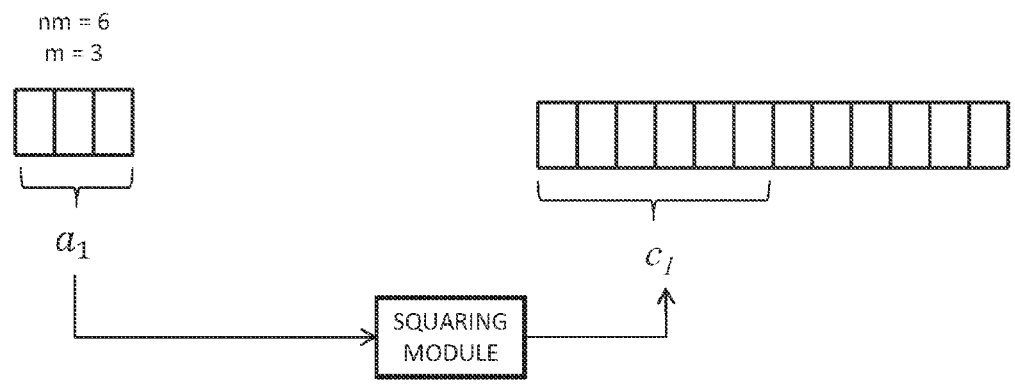

FIG. 4A-4B are example diagrams of a squaring circuit operating on a six bit string using a three bit substring corresponding to a chosen substring length of m=3 ($\beta=2^3=8$). FIGS. 4A-4B show two iterations used for calculating a value $\alpha^2$, where $\alpha$ has a bit length nm=6 and a substring length m=3 since $\beta$ is chosen to be $2^3$. In FIG. 4A, the least significant input bits are represented as $a_0$ and the remaining bits as $A_0$. The least significant bits $a_0$ include 3 bits (m=3). Because the bit length of $\alpha$ is 6, this calculation requires O(2) iterations since 3×2=6. The bits $a_0$ are received into the squaring module, and output as $c_0$ including 6 bits (2m bits) representing two digits of $\alpha^2$ (shown on the right side of the squaring module). In FIG. 4B, the remaining 3 bits of $\alpha$ are then considered. The most significant bits are represented as $a_1$ comprised of 3 bits (m=3). Again, the value $a_1$ is received by the squaring module, and the output $c_1$ includes 6 bits (2m bits) representing two digits of the output value $\alpha^2$.

FIG. 5A is an example of a portion of a process flow diagram 500 for squaring an input value in accordance with the present disclosure. The example process flow described here is applicable for m=2. An input operand $\alpha$ and a substring size m are received (502). The input operand may be identified as a binary digit string, $\alpha$ (504). The least significant digit (LSD) substring, a, of the substring size m can be determined (506). The LSD substring can be decatenated from binary digit string to form a word, A (508). A radix $\beta$ is determined as $2^m$ (510). A residual value, b, is determined, as b=$\alpha$-$\beta$/2 (512). $T_1$ is determined as (A/$\beta$) $2^{2m}$+($\beta$/2)$^2$ (514).

Figure 5B:
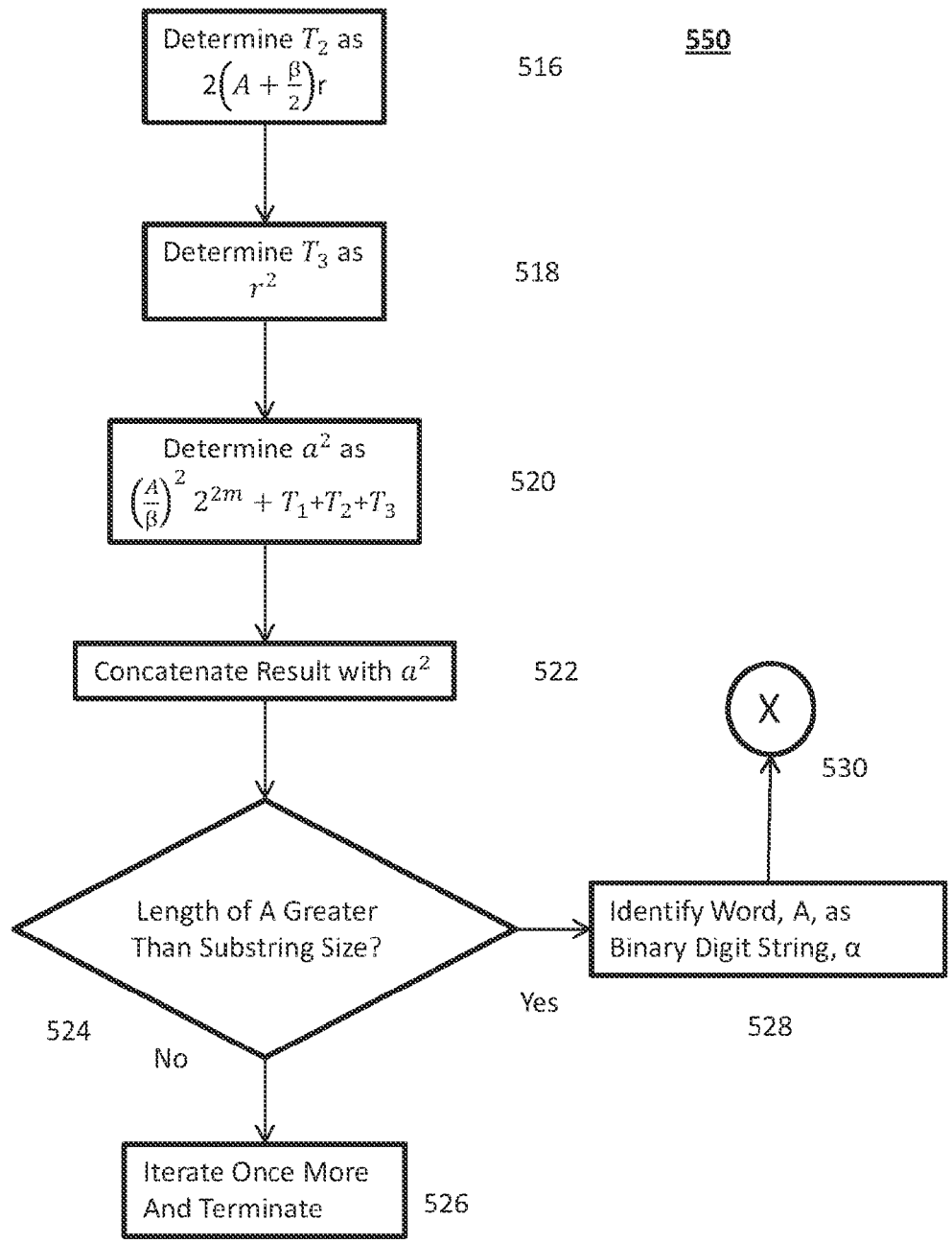
FIG. 5B is an example of another portion of the process flow diagram for squaring an input value in accordance with the present disclosure.

FIG. 5B is an example of another portion of the process flow diagram 550 for squaring an input value in accordance with the present disclosure. Continuing from step 514, $T_2$ is determined as 2(A+$\beta$/2)b (516). $T_3$ is determined as $b^2$ (518). The value $\alpha^2$ can be determined as (A/$\beta$)$^2$ $2^{2m}$+$T_1$+$T_2$+$T_3$ (520). The resulting value $\alpha^2$ can be concatenated with previous results, if any, as the most significant digit having bit length 2m (522). A determination may be made as to whether the length of A is greater than the substring size m (524). If A is less than or equal to m, then the process can iterate one additional time to account for a non-zero residual value and then terminates (526). If the size of A is greater than m, then A can be identified as a word A and as the binary digit string, $\alpha$ (528). Then, the process follows back to point (X) 530, which connects prior to point 506 of FIG. 5A. The process then continues until it terminates based on the condition at point 524.

A number of implementations have been described. Nevertheless, it will be understood that various modifications may be made including portions or the entirety of the implementation in software form. Accordingly, other implementations are within the scope of the following claims.

What is claimed is:

1. An apparatus comprising:
a squaring circuit configured to:
identify a fixed-point value with a fixed word size and a substring size for substrings of the fixed-point value, wherein the fixed-point value comprises a string of digits and an initial operand;
for an initial iteration, determine a square of least significant digits of the initial operand;
for each subsequent iteration:
determine an operand for that iteration by decatenating least significant digits from an operand in a previous iteration, wherein a length of the least significant digits from the operand of the previous iteration is equal to the substring size; and
determine a square using the least significant digits of the operand for that iteration and the substring size; and
concatenate the squares from each iteration to estimate a square of the fixed-point value.

2. The apparatus of claim 1, wherein each digit in the string of digits is in base 2.

* * * * *